United States Patent
Vraa et al.

(10) Patent No.: US 12,011,824 B2
(45) Date of Patent: Jun. 18, 2024

(54) ROBOT JOINT COMPRISING BRAKE ASSEMBLY

(71) Applicant: Universal Robots A/S, Odense S (DK)

(72) Inventors: Mikkel Johansen Vraa, Svendborg (DK); Rasmus Borgbjerg Nielsen, Odense NV (DK)

(73) Assignee: UNIVERSAL ROBOTS A/S, Odense S (DK)

( * ) Notice: Subject to any disclaimer, the term of this patent is extended or adjusted under 35 U.S.C. 154(b) by 588 days.

(21) Appl. No.: 17/054,260

(22) PCT Filed: May 17, 2019

(86) PCT No.: PCT/EP2019/062750
§ 371 (c)(1),
(2) Date: Nov. 10, 2020

(87) PCT Pub. No.: WO2019/219886
PCT Pub. Date: Nov. 21, 2019

(65) Prior Publication Data
US 2021/0237284 A1    Aug. 5, 2021

(30) Foreign Application Priority Data
May 18, 2018  (EP) ................................. 18173224

(51) Int. Cl.
*B25J 19/00*    (2006.01)
*F16D 65/18*    (2006.01)
(Continued)

(52) U.S. Cl.
CPC .......... *B25J 19/0004* (2013.01); *F16D 65/18* (2013.01); *F16D 2121/24* (2013.01); *F16D 2125/40* (2013.01); *F16D 2127/06* (2013.01)

(58) Field of Classification Search
CPC .... F16D 63/006; F16D 65/18; F16D 2121/24; F16D 2125/40; F16D 2127/06; B25J 9/10; B25J 17/00; B25J 19/0004
See application file for complete search history.

(56) References Cited

U.S. PATENT DOCUMENTS 2,351,997 A * 6/1944 Morrill ................... H02K 7/108
                                                310/78
6,530,457 B1   3/2003 Nago et al.
(Continued)

FOREIGN PATENT DOCUMENTS

CN    101002033 A    7/2007
CN    102753429 A   10/2012
(Continued)

OTHER PUBLICATIONS

Machine Translation of KR 2016 0077411 (no date).*
(Continued)

*Primary Examiner* — Nicholas J Lane
(74) *Attorney, Agent, or Firm* — Burns & Levinson LLP

(57) ABSTRACT

A robot joint is connectable to at least another robot joint via an output flange. The robot joint includes a joint motor having a motor axle configured to rotate the output flange. The robot joint includes a brake assembly having an annular brake member that is rotatable and a resilient member arranged on the motor axle. The annular brake member and the resilient member are arranged between a first locking member and a positionable locking member, where the positionable locking member can be fixed at a plurality of positions along and at the motor axle. An engagement member is movable between an engaging position and a non-engaging position, where in the engaging position the engagement member engages with the annular brake member and prevents rotation of the annular brake member (Continued)

around the motor axis. The annular may include brake protrusion that includes two slats forming a triangular-like shape.

22 Claims, 9 Drawing Sheets

(51) Int. Cl.
*F16D 121/24* (2012.01)
*F16D 125/40* (2012.01)
*F16D 127/06* (2012.01)

(56) References Cited

U.S. PATENT DOCUMENTS

| | | |
|---|---|---|
| 6,594,844 B2 | 7/2003 | Jones |
| 8,614,559 B2 | 12/2013 | Kassow et al. |
| 8,646,560 B2 | 2/2014 | Chan |
| 9,051,632 B2 | 6/2015 | Kim et al. |
| 9,248,573 B2 | 2/2016 | SøE-Knudsen et al. |
| 9,833,897 B2 | 12/2017 | SøE-Knudsen et al. |
| 10,399,232 B2 | 9/2019 | Oestergaard et al. |
| 10,668,617 B2 | 6/2020 | Jacobsen |
| D895,704 S | 9/2020 | Johansen |
| D895,705 S | 9/2020 | Johansen |
| D895,706 S | 9/2020 | Johansen |
| D898,090 S | 10/2020 | Johansen |
| 10,809,734 B2 | 10/2020 | De Castro |
| 10,850,393 B2 | 12/2020 | Oestergaard et al. |
| D915,487 S | 4/2021 | Sell |
| D924,228 S | 7/2021 | Mirth |
| D932,485 S | 10/2021 | Mirth |
| D932,486 S | 10/2021 | Mirth |
| D932,487 S | 10/2021 | Mirth |
| 11,644,072 B2 * | 5/2023 | Lisciani ............... F16D 65/123 188/218 XL |
| 2006/0259212 A1 | 11/2006 | Jeon |
| 2008/0315728 A1 | 12/2008 | Liu et al. |
| 2012/0022689 A1 | 1/2012 | Kapoor |
| 2012/0253582 A1 | 10/2012 | Chrysanthakopoulos et al. |
| 2013/0079928 A1 | 3/2013 | Søe-Knudsen et al. |
| 2013/0143704 A1 * | 6/2013 | Blank .................... B62M 9/10 474/152 |
| 2013/0255426 A1 | 10/2013 | Kassow et al. |
| 2016/0136805 A1 | 5/2016 | Søe-Knudsen et al. |
| 2017/0057095 A1 | 3/2017 | Oestergaard et al. |
| 2018/0178380 A1 | 6/2018 | Oestergaard et al. |
| 2019/0086907 A1 | 3/2019 | Oestergaard et al. |
| 2019/0301548 A1 * | 10/2019 | Shao .................... H02K 7/1021 |
| 2019/0384314 A1 | 12/2019 | Jacobsen |
| 2020/0004247 A1 | 1/2020 | Jacobsen et al. |
| 2020/0159238 A1 | 5/2020 | Jacobsen et al. |
| 2020/0171658 A1 | 6/2020 | Kielsholm Thomsen |
| 2020/0180169 A1 * | 6/2020 | Shao .................... F16D 63/006 |
| 2020/0241560 A1 | 7/2020 | Gariepy et al. |
| 2020/0324406 A1 * | 10/2020 | Ayuzawa ............... H02K 7/116 |
| 2020/0340569 A1 | 10/2020 | Johansen |
| 2020/0353617 A1 * | 11/2020 | Spenninger ............. F16D 65/16 |
| 2020/0391393 A1 | 12/2020 | Johansen |
| 2021/0039254 A1 | 2/2021 | Oestergaard et al. |
| 2021/0086374 A1 | 3/2021 | Brandt et al. |
| 2021/0088089 A1 * | 3/2021 | An ........................ F16D 67/06 |
| 2021/0237284 A1 | 8/2021 | Vraa et al. |
| 2021/0260757 A1 | 8/2021 | Nielsen et al. |
| 2021/0260759 A1 | 8/2021 | Knudsen et al. |
| 2022/0088768 A1 * | 3/2022 | Kattakuri ................ B25J 17/00 |
| 2022/0212354 A1 * | 7/2022 | Rokahr ................ B25J 19/0004 |
| 2022/0352787 A1 * | 11/2022 | Shinohara ............... H02K 7/10 |

FOREIGN PATENT DOCUMENTS

| | | | |
|---|---|---|---|
| CN | 102954130 A | 3/2013 | |
| CN | 106217405 A | 12/2016 | |
| EP | 0112891 A1 | 7/1984 | |
| GB | 1479980 A | 7/1977 | |
| JP | 2009050641 A | 3/2009 | |
| KR | 2016 0077411 | * 7/2016 | ........... F16D 65/092 |
| WO | 2016049622 A1 | 3/2016 | |
| WO | 2017148499 A1 | 9/2017 | |

OTHER PUBLICATIONS

MiR500 User guide (en) Sep. 2019—v.1.3 © Copyright 2019: Mobile Industrial Robots A/S.
MiR Fleet Reference Guide Jan. 2017 v.1.0, © Copyright 2016-2017 by Mobile Industrial Robots.
MiR100 User Guide, Robot Interface 2.0, Nov. 2017 v.1.0 Copyright © 2016-2017 by Mobile Industrial Robots.
MiR100 User Guide, Robot interface 2.0, Aug. 2018 v.1.1 Copyright © 2017-2018 by Mobile Industrial Robots.
International Preliminary Report on Patentability dated Nov. 24, 2020, International Application No. PCT/EP2019/062750 filed May 17, 2019 (10 pages).
International Search Report dated Nov. 12, 2019, International Application No. PCT/EP2019/062750 filed May 17, 2019 (6 pages).
Written Opinion of the International Searching Authority dated Nov. 12, 2019, International Application No. PCT/EP2019/062750 (9 pages).
First Office Action in Chinese Application No. 201980029494.7 dated Mar. 14, 2024 [with English translation], 15 pages.

* cited by examiner

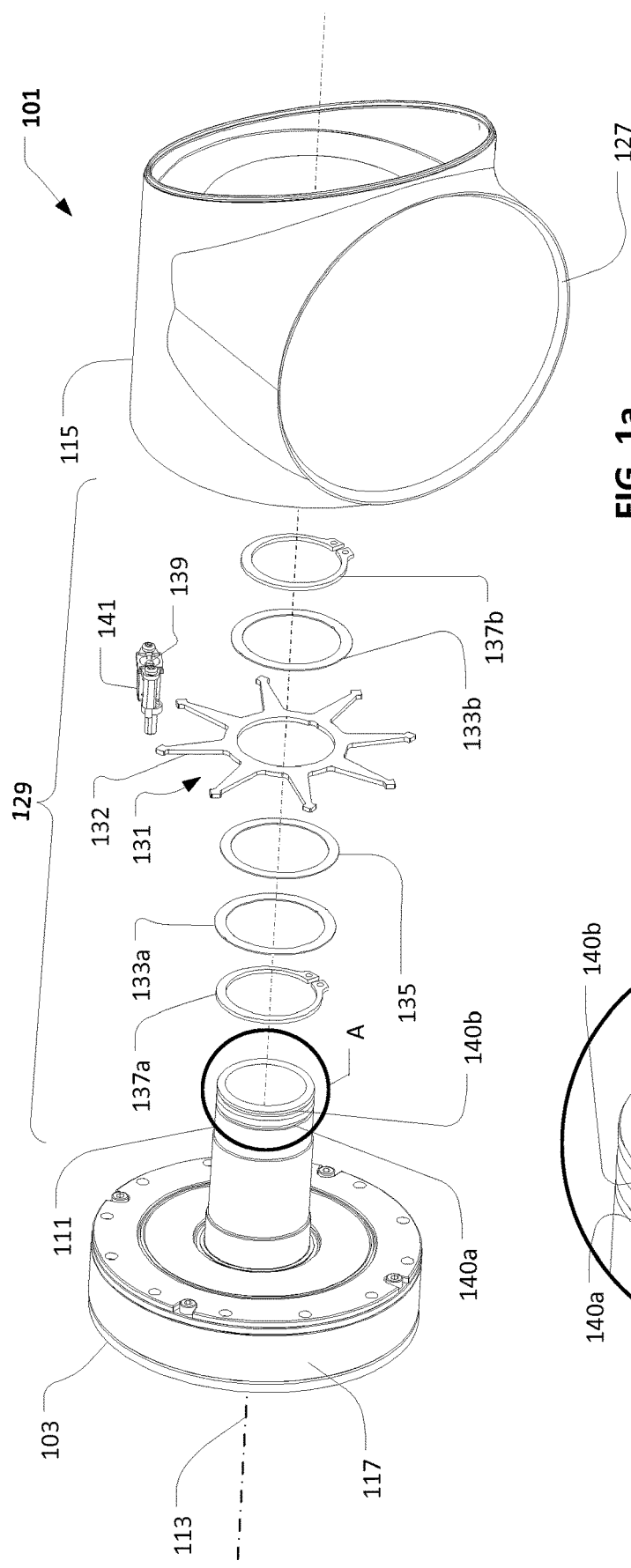
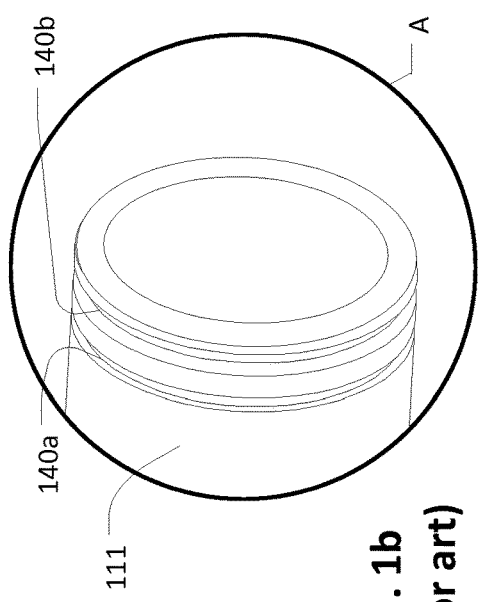
FIG. 1a (prior art)
FIG. 1b (prior art)

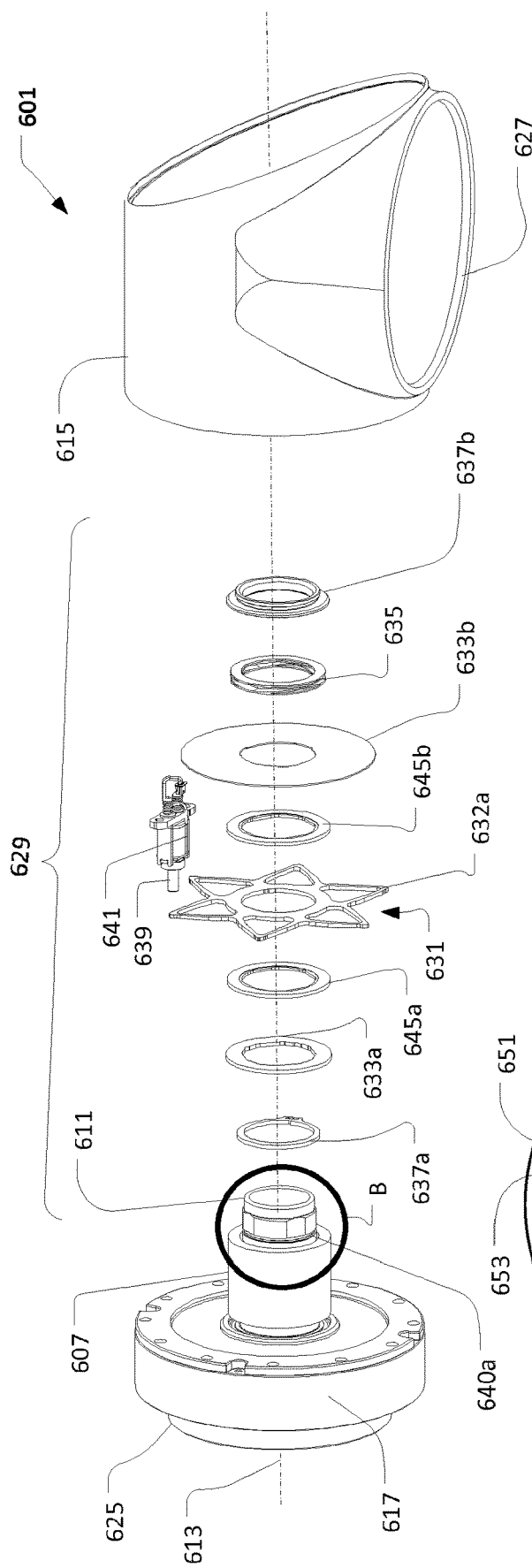

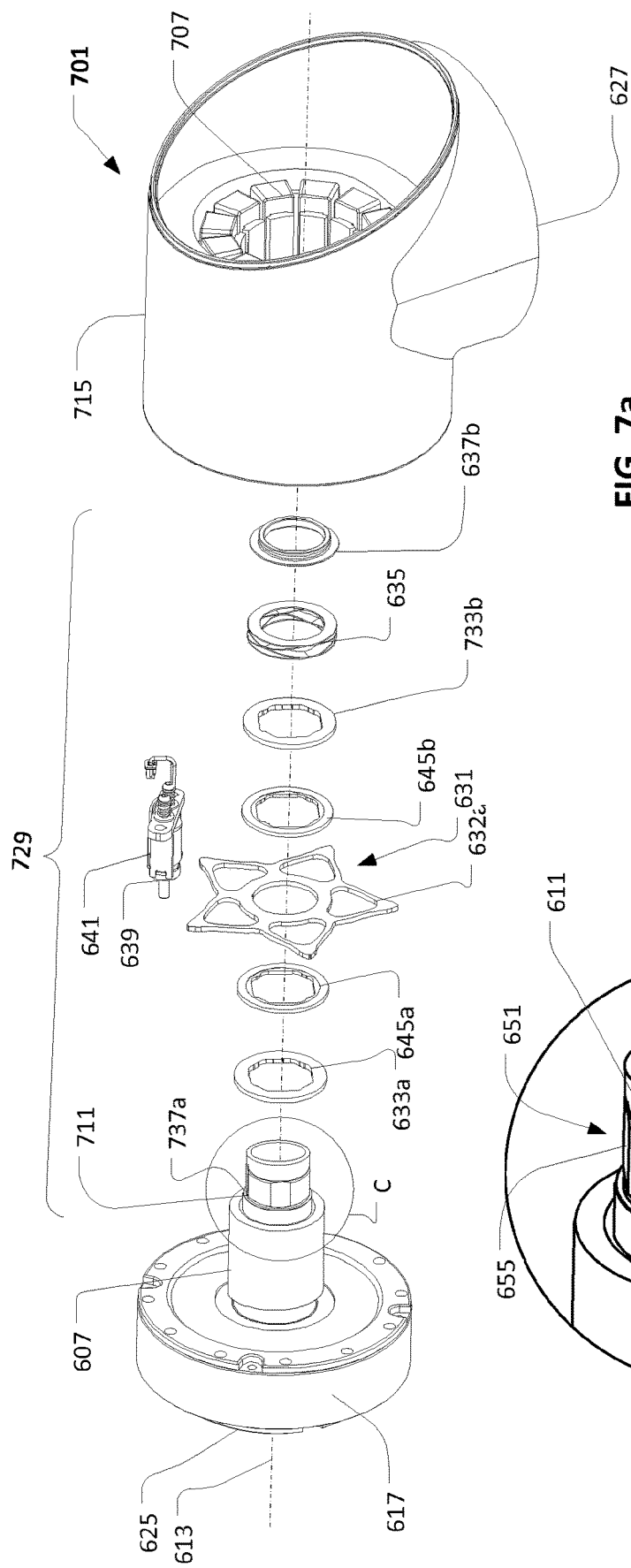
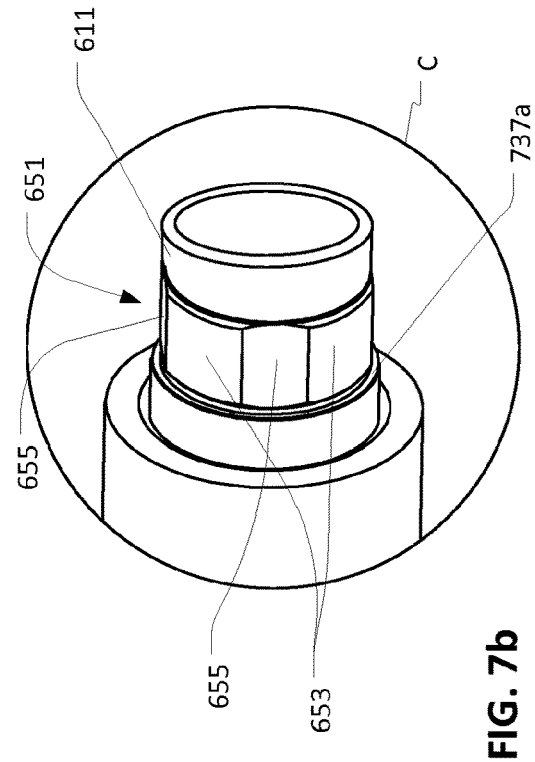
FIG. 7a
FIG. 7b

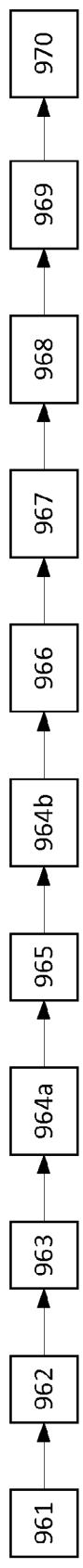
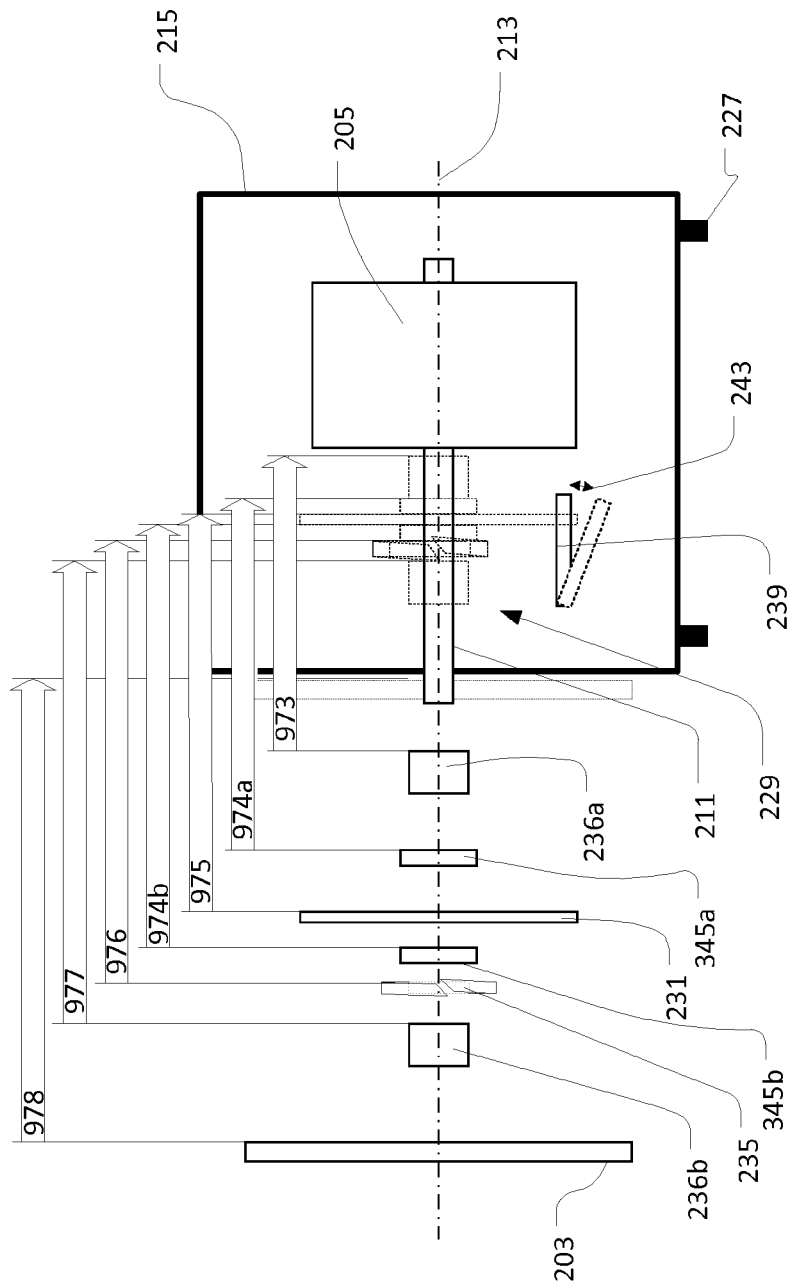
FIG. 9a
FIG. 9b

ROBOT JOINT COMPRISING BRAKE ASSEMBLY

CROSS-REFERENCE TO RELATED APPLICATIONS

This application is a national stage entry of PCT Application No. PCT/EP2019/062750, which was filed on May 17, 2019. PCT Application No. PCT/EP2019/062750 claims priority to European Patent Application No. EP18173224.9, which was filed on May 18, 2018. This application claims priority to PCT Application No. PCT/EP2019/062750 and to European Patent Application No. EP18173224.9. The contents of PCT Application No. PCT/EP2019/062750 and of European Patent Application No. EP18173224.9 are incorporated herein by reference.

FIELD OF THE INVENTION

The present invention relates to robot joint connectable to at least another robot joint via an output flange. The robot joint comprises a joint motor configured to rotate the output flange and a brake assembly configured as a friction brake which can activated and deactivated and provide controlled braking of the output flange.

BACKGROUND OF THE INVENTION

Collaborative robots are a kind of robots that can be set up to work in environments close to humans and even setup to work together or assist humans in their work. Typical collaborative robots are formed as a robot arm comprise a plurality of interconnected robot joints enabling movements of the robot arm. The robot joints comprise an output flange connectable to another robot joint and a joint motor configured to rotate the output flange. The robot joints can be connected directly together or connecting element can be provided between to robot joint.

Further the robot joints comprise a brake assembly configured to prevent the output flange from rotating and preventing the robot joints from rotating in relation to each other. Typically to brake assemblies are configured to be activated upon power down of the motors and in response to safety functions of the robot. The brake assemblies of the joint motor thus make it possible to hold the robot arm in a given position when the robot arm is shut down and does also function as safety brakes during operation of the robot.

FIGS. 1a and 1b illustrate a robot joint of a robot arm with a brake assembly as known form the prior art, where FIG. 1a illustrates an exploded perspective view of the robot joint and FIG. 1b illustrates an enlarge view the part encircled by circle A in FIG. 1a.

The robot joint 101 is connectable to at least another robot joint (not shown) via an output flange 103. The robot joint 101 comprises a joint motor with a motor stator and a motor rotor coupled to a motor axle 111 (motor stator and motor rotor not exploded from joint housing in FIG. 1a). The motor axle is rotatable around a motor axis 113. The motor axle 111 is configured to rotate the output flange 103 in relation to the joint housing 115 via a strain wave gear 117, were the motor axle drives a wave generator arranged inside an annular flexible spline with outer teeth engaging an annular ring of inner teeth of an output axle connected to the output flange as known in the field of strain wave gears. The joint motor, motor axle and strain wave gear are arranged inside a joint housing 115. The illustrated joint comprises also an attachment flange 127 configured to be connected to another joint either directly to the output flange of the other joint or via a connecting element.

The robot joint comprises a brake assembly 129 comprising an annular brake member 131, two annular spacer members 133a and 133b, a resilient member 135, a first locking member 137a, a second locking member 137b and an engagement member 139.

The annular brake member 131 is rotatable arranged on the motor axle. The annular brake member is provided as an annular ring comprising 8 brake protrusions 132 extending outward in relation to the annular ring.

The two annular spacer members 133a, 133b rare rotatable fixed on the motor axle; where the annular brake member 131 is arrange between the two annular spacer members. The annular spacer members are provided as two flat metal rings.

The resilient member 135 is provided at the motor axle and the resilient member 135 is provided as annular leaf spring arranged at the motor axle.

The first locking member 137a and a second locking member 137b are arranged at opposite sides of the annular brake member, such that the annular brake member, the first and second spacer members and the resilient member are arranged between the first locking member and the second locking member in a tense setting. Consequently, the resilient member is configured to apply a pressing force to the annular brake member. The first and second locking members are provided as resilient locking rings which has a smaller diameter than the motor axle and which can be forced into a corresponding locking recesses 140a and 140b at the motor axle.

The engagement member 139 is arrange in the joint housing and is movable between an engaging position and a non-engaging position, where in the engaging position the engagement member engages with the annular brake member and prevents rotation of the annular brake member around the motor axis, and where in the non-engaging position the engagement member allows the annular brake member to rotate around the motor axle. The engagement member is provided as a brake pin which can be moved between the engaging position and the non-engaging position by a solenoid 141.

In the engaging position to solenoid releases the brake pin and the brake pin moves into a position between two neighboring brake protrusions of the annular brake member, and the annular brake member will rotate until one of the brake productions bumps into the engaging pin. Consequently, the annular brake member stops rotating, and the motor axle is brought to stop due to the friction between the annular brake member, the annular spacer members caused by the pressing force provided the resilient member 135 between the first and second locking members. Due to manufacturing tolerances of the components it is difficult to assembly the brake assembly such that it provides proper braking of the motor axle.

U.S. Pat. No. 8,410,732B2 discloses a programmable robot system includes a robot provided with a number of individual arm sections, where adjacent sections are interconnected by a joint. The system furthermore includes a controllable drive mechanism provided in at least some of the joints and a control system for controlling the drive. The robot joints comprise a safety brake, which stops the robot for instance at power drop-out, The safety brake comprises solenoid, which in the event of power drop-out displaces a ratchet into engagement with an annular member mounted on the motor axle of the joint motor. This annular member (friction ring) can rotate relative to the motor axle, but there is a high friction between the annular member and the motor axle. This ensures a controlled halt of the joint but without halting the joint so abruptly that the robot arm becomes overloaded.

U.S. Pat. No. 9,579,805 discloses a brake device of a robot arm, which utilizes a brake disc whose diameter is much larger than a diameter of a ratchet for increasing a contacting area of the brake disc, to generate a greater friction force. The brake device further utilizes a combining pin, a combining plate, and a plurality of guiding pins for transferring a rotating torque to the brake device having a larger diameter, so as to extend a moment arm of the friction force and generate a greater moment, which reduces a prepressing force and extends life of the brake device.

WO17148499 discloses multiple disc brake for an industrial robot, wherein the multiple disc brake includes a hub. The multiple disc brake includes at least one friction disc arranged to the hub such that it rotates with the motion of the hub, and a braking disc arranged freely rotatable to the hub. The multiple disc brake includes a housing accommodating the hub and the actuating arrangement, wherein the housing is arranged to be attached to the motor of an axis of an industrial robot. Consequently, it not is difficult to integrate the multiple disc brake inside a robot join housing and thereby provide a compact robot joint.

There is a need to provide a reliable, safe and cost-effective brake assembly for collaborative robots.

SUMMARY OF THE INVENTION

The object of the present invention is to address the above described limitations with the prior art or other problems of the prior art. This is achieved by a robot joint and a method of braking a robot joint according to the independent claims, where a robot joint connectable to at least another robot joint via an output flange is provided. The robot joint comprises a joint motor having a motor axle configured to rotate the output flange. The robot joint comprises a brake assembly comprising an annular brake member rotatable and a resilient member arranged on the motor axle. The annular brake member and the resilient member are arranged between a first locking member and a positionable locking member, where the positionable locking member can be fixed at a plurality of positions along the motor axle, consequently the brake friction of the brake assembly can be adjusted very precisely. An engagement member is movable between an engaging position and a non-engaging position, where in the engaging position the engagement member engages with the annular brake member and prevents rotation of the annular brake member around the motor axis. The advantages and benefits of the present invention is described in further detail in the detailed description of the invention. The dependent claims described advantageously embodiments of the present invention and the advantages and benefits of these embodiments are also described in the detailed description.

BRIEF DESCRIPTION OF THE DRAWINGS

FIGS. 1a and 1b illustrate a robot joint comprising a brake assembly according to prior art;

FIGS. 6a and 6b illustrate a robot joint comprising a brake assembly according to the present invention;

FIGS. 7a and 7b illustrate a robot joint comprising a brake assembly according to the present invention;

FIGS. 9a and 9b illustrate a method of braking a robot joint of a robot arm according to the present invention;

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 2:
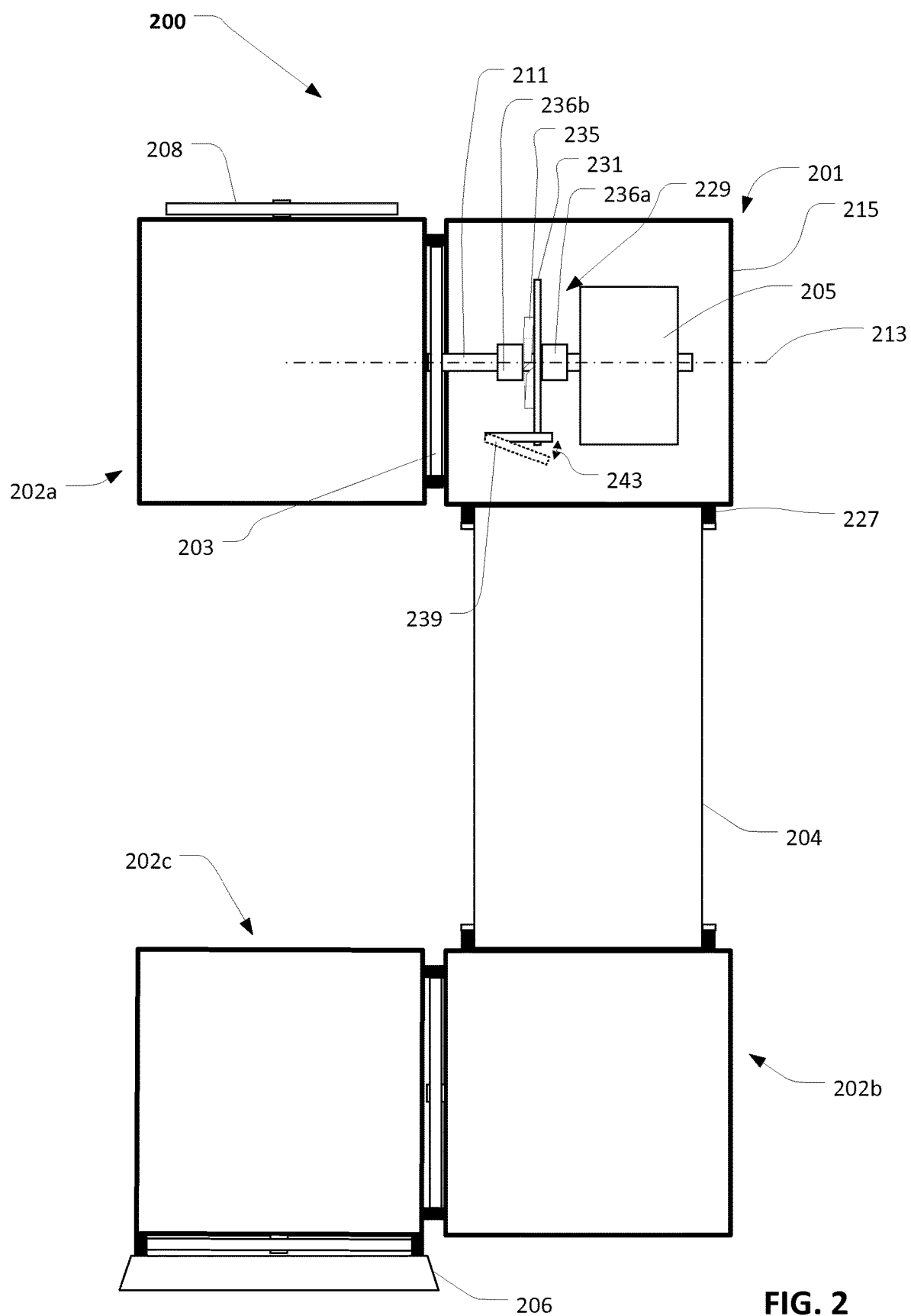
FIG. 2 illustrates cross sectional structural diagram of a robot arm comprising a robot joint with a brake assembly according to the present invention.

FIG. 2 illustrates a cross sectional structural diagram of a robot arm 200 comprising a robot joint 201 with a brake assembly according to the present invention. The robot joint 201 is connectable to at least another robot joint either via an output flange 203 and/or an attachment flange 227. It is to be understood that the robot joint 201 can be connected directly to the other joint or connected to the other joint via a connecting element 204. In the illustrated embodiment the robot joint 201 is connected directly to robot joint 202a via the output flange and is via connecting element 204 connected to robot joint 202b.

Further robot joint 202b is connected directly to robot joint 202c which is connected to a robot base 206. Consequently, the illustrated robot arm comprises four joints and represent thus a four axis robot, however it is to be understood that the robot arm can be configured with any number larger than 2 robot joints. The output flange of joint 202a constitutes a tool flange of the robot arm where to a large variety of robot tools (not shown), such as mechanical grippers, vacuum grippers, welding tools or other kind of end effectors, can be attached. In many embodiments the robot arm is provided as a 6-axis robot comprising 6 robot joints, as this provided a large degree of freedom of moving the tool flange of such robot in a 3 dimensional environment. It is noted that the other robot joints 202a, 202b, 202c of the robot can be provided with a similar brake assembly as described in connection with robot joint 201, however they may also comprise none or other types of brake assemblies.

The robot joint comprises a joint motor 205 having a motor axle 211 rotatable around a motor axis 213 (illustrated by dashed dotted line). The motor axle is configured to rotate the output flange 203 in relation to the joint housing 215, wherein the joint motor and brake assembly are arranged.

The robot joint 201 comprises a brake assembly 229 comprising an annular brake member 231, at least one resilient member 235, a first positionable locking member 236a and a second positionable locking member 236b and an engagement member 239. The annular brake member 231, the least one resilient member 235 and the first 236a and second locking members 236b are arranged at the motor axle 211.

The annular brake member 231 is rotatable arranged on the motor axle 211 and the at least one resilient member 235 is configured to apply a pressing force in a direction along the motor axle and to the annular brake member 231. That the annular brake member 231 is rotatable arranged on the motor axle means that the annular brake member can rotate in relation to the motor axle while arranged at the motor axle. The first positionable locking member 236a and a second positionable locking member 236b are arranged at opposite sides of the annular brake member and the at least one resilient member such that the annular brake member and the at least one resilient member are arranged between the first positionable locking member and the second positionable locking member in a tense setting. The engagement member 239 is movable (illustrated by arrow 243) between an engaging position (in solid lines) and a non-engaging position (in dotted lines), where in the engaging position the engagement member engages with the annular brake member and prevents rotation of the annular brake member around the motor axis, and where in the non-engaging position the engagement member allows the annular brake member to rotate around said motor axis. The annular brake member stops rotating around the motor axis when the engagement member moves into the engaging position, and the motor axle is brought to stop due to friction between the annular brake member, the resilient member and the locking members. The resilient member is provided in a tense setting between the locking members and provides a pressing force to the annular brake member, as a consequence the friction between the annular brake member, the resilient member and the locking members are increased compared to a situation where the resilient member is arranged in a nonetense setting.

The first positionable locking member 236a and/or the second positionable locking member 236b are provided and can be fixed at a plurality of positions along the motor axle, whereby the distance between the first positionable locking member 236a and the second positionable locking member 236b can be adjusted. The result is that the tension of the resilient member can be adjusted by varying the distance between the first positionable locking member 236a and the second positionable locking member 236b. Consequently, the pressing force applied to the annular brake member by the resilient member can also be adjusted and results in the fact that the friction between the annular brake member, the resilient member and the locking members can be adjusted. Arranging the positionable locking member closer to each other results in the fact that the resilient member is tenser and that the friction between the annular brake member, the resilient member and the locking members increases. The brake assembly thus makes it possible to adjust the friction of the brake and makes it easier during manufacturing of the robot joint to provide a robot joint with accurate brake friction and properties. For instance the brake assembly can be adjusted such that the friction of the brake assembly lies within a range allowing the motor axle to stop within a certain time, rotation distance etc. without damaging gear systems or the motor of the robot joint. Further the friction of the brake can also be adjusted such that a person can rotate the robot joint even when the brake is engaged, as this ensures that a person being restrained by the robot arm can move the robot arm and be release from the restrained position. The required friction of the brake depends on the dimensions of the robot such as size and weight of the robot joints, size and weight of robot links between the joints properties of an eventual gearing system, properties of the motor etc.

In the illustrated embodiment both the first and second positionable locking members 236a, 236b can be arranged in a plurality of positions along the motor axle, however it is to be understood that only one of the locking members need to be provided as a positionable locking member that can be arrangeable in a plurality of positions along the motor axle in order to adjust the distance between the first and second locking members. For instance, the second locking member may be provided as a fixed locking member which can not be moved along the motor axle while the first positionable locking member can be arranged at a plurality of positions along the motor axle.

The annular brake member can be provided as any annular brake member which can be rotatable attached to the motor axle and which can engage with the engagement member in a manner preventing the annular brake member to rotate around the motor axis. The annular brake member and engagement member can be provided as known in the prior art for instance as the annular brake member 131 and corresponding engagement member 139 illustrated in FIG. 1a-1c. Further embodiments of the annular brake member and engagement member can be seen in the following figures.

The joint housing and joint motor can be provided as known in the art for instance as a three phase motor, stepper motor or the like. In the illustrated embodiment the output flange 203 is connected directly to the motor axle 211, however it is to be understood that one or more gear systems may be provided to provide gearing between the motor axle and the output flange. Such gear systems may be provided as any kind of gear systems for instance comprising toothed wheels, belts, chains, pulleys, planet gears, strain wave gears etc.

The locking members 236a, 236b that can be arrange at a plurality of position along the motor axle can be provided as any mechanical component which can be fixed at a plurality of positions along the motor axle by such force that the looking member are kept at the desired position, when the resilient member is provided in the tense setting.

The positionable locking member can for instance be provided as clamp rings comprising clamping means configured to clamp the clamp ring at the desired position along the motor axle and by such force that the clamp ring is kept at the desired position, when the resilient member is provided in the tense setting. For instance, the claim ring can be provided as an open metal ring where the open ends of the metal ring can be pressed together by a screwing mechanism.

Also, the positionable locking member can be provided as a cross bolt locking ring which can be screwed on a thread provided at the motor axle and then clamp the bolt locking ring at the desired position. Such a system makes it possible to adjust the position of the positionable locking member along the motor axle by rotating the cross bold locking ring and then clamp it by the locking the clamp at the desired position.

Also, the positionable locking member can be provided as a ring which is locked to the motor axle by one or more set screws screwed through a threaded hole in the locking ring until the screws locks on the locking ring to the motor axle.

Also, the positionable locking member can be provided as a press fit ring, which can be secured on the motor axle by forcing a ring having a slightly small diameter than the motor axle onto the motor axle by pressing the positionable locking member until it is at in the desired position.

The resilient member can be provided as any resilient component which can be arranged on the motor axle and which can be brought into a tense setting by squeezing it between the locking members, such that the resilient member provides a pressing force to the annular brake member. The resilient member can for instance be provided as a helix shaped spring, a spring lock washer, curved spring lock washer, curved annular springs, wave springs etc.

Figure 3:
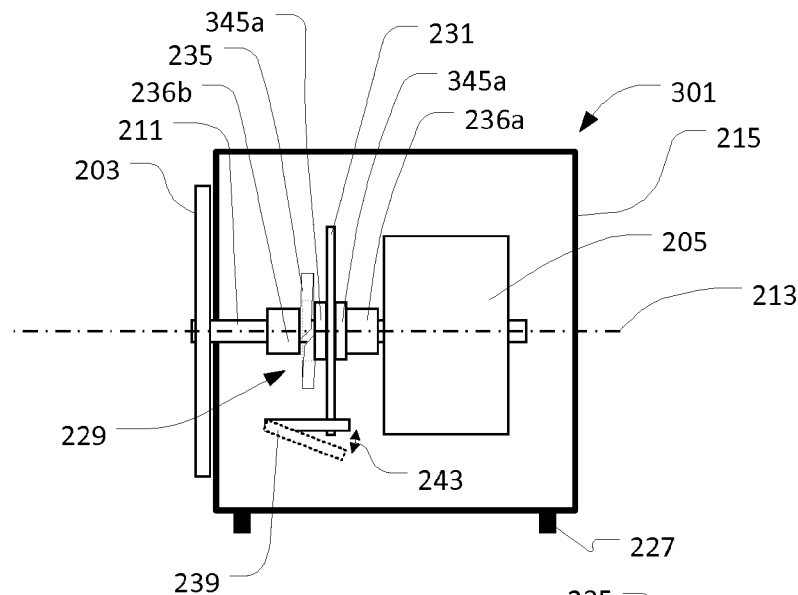
FIG. 3 illustrates a cross sectional structural diagram of a robot joint comprising a brake assembly according to the present invention.
Figure 4:
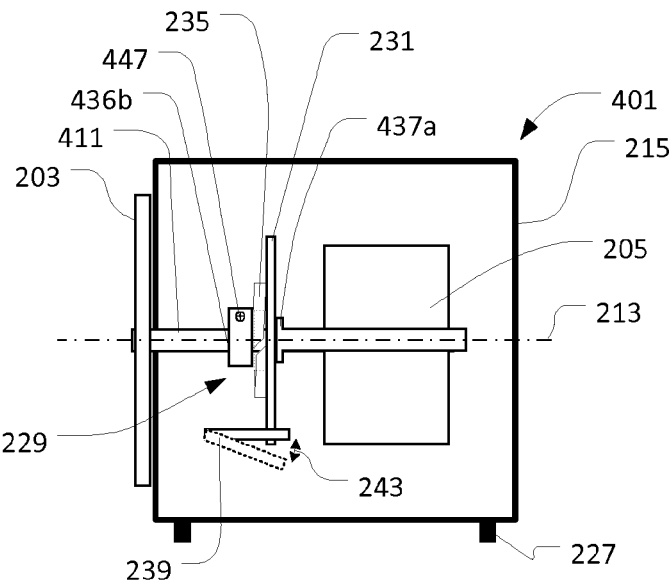
FIG. 4 illustrates a cross sectional structural diagram of a robot joint comprising a brake assembly according to the present invention.
Figure 5:
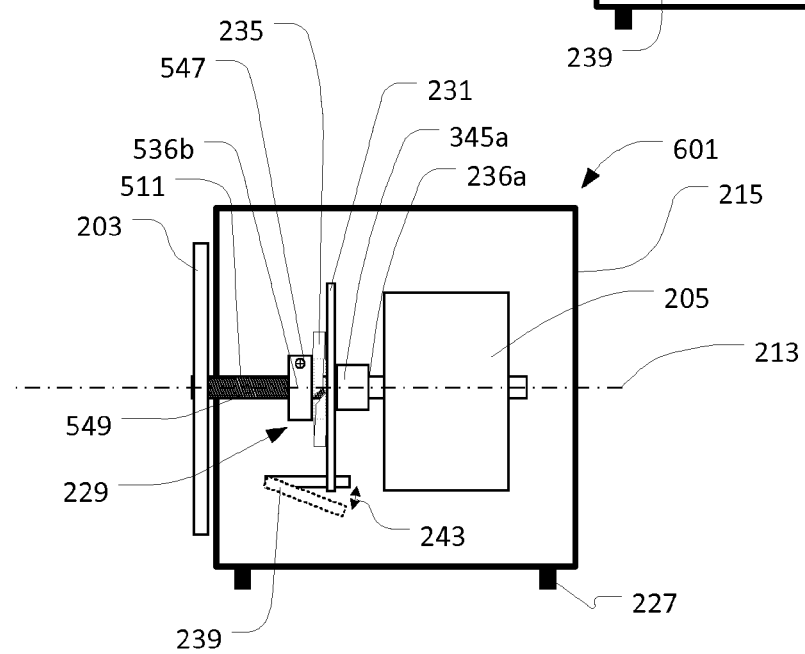
FIG. 5 illustrates a cross sectional structural diagram of a robot joint comprising a brake assembly according to the present invention.

FIGS. 3-5 illustrate cross sectional structural diagrams of different embodiments of robot joints 301, 401, and 501 with a brake assembly according to the present invention. The robot joints 301, 401 and 501 are similar to the robot joint 201 described in connection with FIG. 2 and similar elements have been given the same reference numbers as in FIG. 2 and will not be described in further detail. It is to be understood that the robot joints illustrates in FIG. 2-6 serve to illustrate the principles of further embodiments of the present invention and that the features of the illustrated embodiments of FIG. 2-6 can be combined into other embodiments.

FIG. 3 illustrates an embodiment of the robot joint 301, where the brake assembly comprises at least one annular friction member. The annular friction member and the annular brake member are arranged in physical contact. The annular friction member serves to increase the friction between the annular brake member and motor axle, whereby the motor axle can be stopped more efficiently. Further the annular friction member makes it possible to provide a resilient member having reduced tensioning force and/or arrange the locking members in positions where the resilient member is configured in less tension state. The annular friction member can also be provided to reduce wear between the annular brake member, the motor axle and/or the locking member.

In the illustrated embodiments the robot joint comprises a first annular friction member 345a and a second annular friction member 345b arranged at the motor axle, in physical contact with the annular brake member 231 and at opposite sides of the annular brake member. The annular brake member is thus arranged between the first annular friction member and the second annular friction member. During braking of the motor axle, the annular brake member is prevented from rotating around the motor axis by the engagement member. The first and second annular friction members provides friction force respectively between the annular brake member and the first and the second locking members.

The annular friction members can be non-rotatable arranged on the motor axle and rotate together with the motor axle, and the annular brake member is rotational displaced in relation to the annular friction members during braking whereby friction force is generated.

Also, the annular friction members can be rotatable attached to the motor axle and during braking of the annular brake member, the annular friction member and the motor axle will be displaced in relation to each other whereby friction force is generated.

Alternatively, the annular friction members can be rotational fixed in relation to the annular brake member and stop together with the annular brake member when the engaging member prevents the annular brake member from rotating around the motor axis. In such embodiment the friction force is generate due to displacement between the annular friction member and the motor axle and/or locking members.

The annular friction member can for instance be provided as a ring arranged next to the annular brake member on the motor axle. The annular friction member can be formed in any material capable of increasing the friction between the annular brake member and the motor axle and/or locking members, such as metal, rubber, polymer.

FIG. 4 illustrates an embodiment of the robot joint 401, where the first locking member 437a is provided as a fixed locking member at a fixed position along the motor axle and the second locking member 436b is provided as a positionable locking member which can be positioned at a plurality of positions along the motor axle. The annular brake member 231 and the resilient member 235 are arrange between the first locking member 437a and the second positionable locking member 436b in a tense setting where the tension can be adjusted by arranging the second positionable locking member in at a desired position along the motor axle. In the illustrated embodiment the first locking member 437a is embodied as an annular protrusion of the motor axle 411 and the second positionable locking member 436b is provided as a clamp ring which is clamped to the motor axle at the desired position by a clamp screw 447. The first locking member 437a, which is provided at a fixed position along the motor axle, can also be provided as a locking ring arranged in a recess of the motor axle illustrated as locking ring 137a in FIGS. 1a-1c.

FIG. 5 illustrates an embodiment of the robot joint 501, where the second positionable locking member 536b is provided as a cross bolt locking ring which is screwed on a thread 549 provided at the motor axle 511, where the cross bolt locking ring is clamped at the desired position using a clamp screw 547.

FIGS. 6a-6b illustrate a robot joint 601 of a robot arm with a brake assembly according to the present invention; where FIG. 6a illustrates an exploded perspective view of the robot joint and FIG. 6b illustrates an enlarge view of the part encircled by circle B in FIG. 6a.

The robot joint 601 is connectable to at least another robot joint (not shown) via an output flange (not shown). The robot joint 601 comprises a joint motor with a motor stator and a motor rotor coupled to a motor axle 611 (motor stator not exploded from joint housing in FIG. 6a). The motor axle is rotatable around a motor axis 613. The motor axle 611 is configured to rotate the output flange (not show) in relation to the joint housing 615 via a strain wave gear 617, were the motor axle drives a wave generator arranged inside an annular flexible spline with outer teeth engaging an annular ring of inner teeth of an output axle 625 connected to the output flange. The joint motor, motor axle, strain wave gear are arranged inside a joint housing 615. The illustrated joint comprises also an attachment flange 627 configured to be connected to another robot joint either directly to the output flange of the other robot joint or via a connecting element.

The robot joint comprises a brake assembly 629 comprising an annular brake member 631, two annular spacer members 633a and 633b, two annular friction member 645a, 645b, a resilient member 635, a first locking member 636a, a second positionable locking member 636b and an engagement member 639.

The annular brake member 631 is rotatable arranged on the motor axle 611. The annular brake member is provided as an annular ring comprising six brake protrusions 632a extending outward in relation to the annular ring. The engagement member 639 is arrange in the joint housing and is movable between an engaging position and a non-engaging position, where in the engaging position the engagement member engages with the annular brake member and prevents rotation of the annular brake member around the motor axis, and where in the non-engaging position the engagement member allows the annular brake member to rotate around the motor axis. The engagement member is provided as a brake pin 639 which can be moved between the engaging position and the non-engaging position by a solenoid 641 controlled by a control mechanism of the robot and/or robot joint. The brake pin is in the engaging position moved into a position between two neighboring brake protrusions of the annular brake member, and the annular brake member will rotate until one of the brake protrusions bumps into the engaging pin. Consequently the annular brake member is prevented from rotating around the motor axis.

In this embodiment, the six brake protrusions are embodied as a frame work of interconnected slats where each brake protrusion comprises two slats forming a triangular like shape, where the two slats form the sides of the triangular like shape and where a central part of the annular brake member forms the bottom side of the triangular like shape. Providing the brake members as two slats forming a triangular like shape makes it possible to provide a light and robust annular brake member with a low inertia, as the triangular like shape formed by the two slants supports reduces deformation of the brake members. The slant that bumps into the engaging member will bend in a direction opposite the direction of rotation of the annular brake member, however in this embodiment the other slant reduces/prevents such deformation as it takes up some of the forces applied to the brake member during the bump. Providing the brake members as a framework of slants makes it possible to reduce the mass of the brake member and as a consequent to rotational inertia of the annular brake member is reduced resulting in easier stoppage of the annular brake member.

The resilient member 635 is provided at the motor axle and is embodied as a wave spring providing a pressing force to the annular brake member 635, when squeezed into a tense setting by the first and second locking members.

In this embodiment the first locking member 636a is provided as a press fit ring which has a smaller diameter than the motor axle and which can be forced onto the motor axle and locked in a corresponding locking recess 640a at the motor axle. The first locking member 636a is thus fixed in the same position along the motor axle.

The second positionable locking member is provided as a press fit ring 636b, which is secured on the motor axle by forcing the press fit ring 636b onto the motor axle. The press fit ring has a slightly smaller diameter than the outer part of motor axle and can be pressed onto the motor axle by pressing the positionable locking member along the motor axle. It is thereby possible to arrange the press fit ring at a plurality of positions along the motor axle, whereby the distance between the locking ring 636a and the press fit ring 636b can be adjusted. The result is that the tension of the resilient member can be adjusted by varying the distance between the locking ring 636a and the press fit ring 636b. Consequently, the pressing force applied to the annular brake member by the resilient member can be adjusted and results in the fact that the friction between the annular brake member, the resilient member, friction members, the locking members and motor axle can be adjusted.

The first spacer member 633a is provided as a flat metal ring non-rotatable arranged at the motor axle via a shape encoded part 651 of the motor axle and an inner circumferential encoded shape of the first space member 633a. The shape encoded part 651 of the motor axle has a general circular cross section 653 with four straight chords of the circle 655 formed in the circular cross section. Similar the inner circumferential encoded shape of the first space member has been formed with a general circular cross section with four straight chords of the circle formed in the circular cross section. The first spacer member fits on the encoded part of the motor axle and is prevented from rotating in relation to the motor axle due to the edges formed between the circular part and the straight chords part of the shape encoded part. The first spacer member also serve to distribute the pressing force between the locking ring 636a and the first annular friction member 645a over a larger area. It is noted that the encoded shaped part of the motor axle and the corresponding inner circumferential encoded shape of the first spacer member can be provided in many different shapes and forms which prevents the first spacer member from rotating around the motor axle.

The second spacer member 633b is provided as a flat metal ring and is rotatable fixed to the motor axle as it has a general circular inner circumferential shape having a diameter that fits over the circular cross section of the encoded part 651 of the motor axle and thus can rotate in relation to the motor axle. The second spacer member has a cross section diameter that covers the annular brake assembly and thus acts as a protective cover of the annular brake member, for instance to cover the openings of the frame work of interconnected slats of the annular brake member. The second spacer member also serve to distribute the pressing force between the resilient member 635 and the second annular friction member 645b over a larger area.

In the illustrated embodiments the robot joint comprises a first annular friction member 645a and a second annular friction member 645b arranged at the motor axle, in physical contact with the annular brake member 631 and at opposite sides of the annular brake member. The inner circumferential shape of the first and second friction members have been formed as inner circumferential encoded shapes that matches the shape encoded part 651 of the motor axle. The inner circumferential encoded shapes of the annular friction members are thus formed as a general circular cross section with four straight chords of the circle formed in the circular cross section. Consequently, the first and second annular friction members are non-rotationally arrange at the motor axle. During braking of the motor axle, the annular brake member is prevented from rotating around the motor axis by the engagement member, and the first and second annular friction members provides friction force between the annular brake member and the motor axle. The annular friction member can be formed in any material cable of increasing the friction between the annular brake member and the locking members metal, rubber, polymer, carbon, ceramics and/or combinations thereof.

FIGS. 7a-7b illustrate a robot joint 701 of a robot arm with a brake assembly according to the present invention; where FIG. 7a illustrates an exploded perspective view of the robot joint and FIG. 7b illustrates an enlarge view of the part encircled by circle C in FIG. 7a. The robot joints 701 is similar to the robot joint 601 described in connection with FIGS. 6a and 6b and similar elements have been given the same reference numbers as in FIGS. 6a and 6b and will not be described in further detail. In this illustration the motor stator 707 is visible inside the robot housing 715.

In this embodiment the first locking member 737a of the brake assembly 729 is provided as an annular protrusion of the motor axle 711 and first spacer member 633a rests at the annular protrusion of the motor axle. The annular protrusion extends to the end of the motor axle 711 and into the strain wave gear. The motor stator 607 is thus attached to the annular protrusion. The second spacer 733b is identical to the first spacer and serves to distribute the force between the second friction member 645b and the resilient member 635.

Figures 8A, 8B:
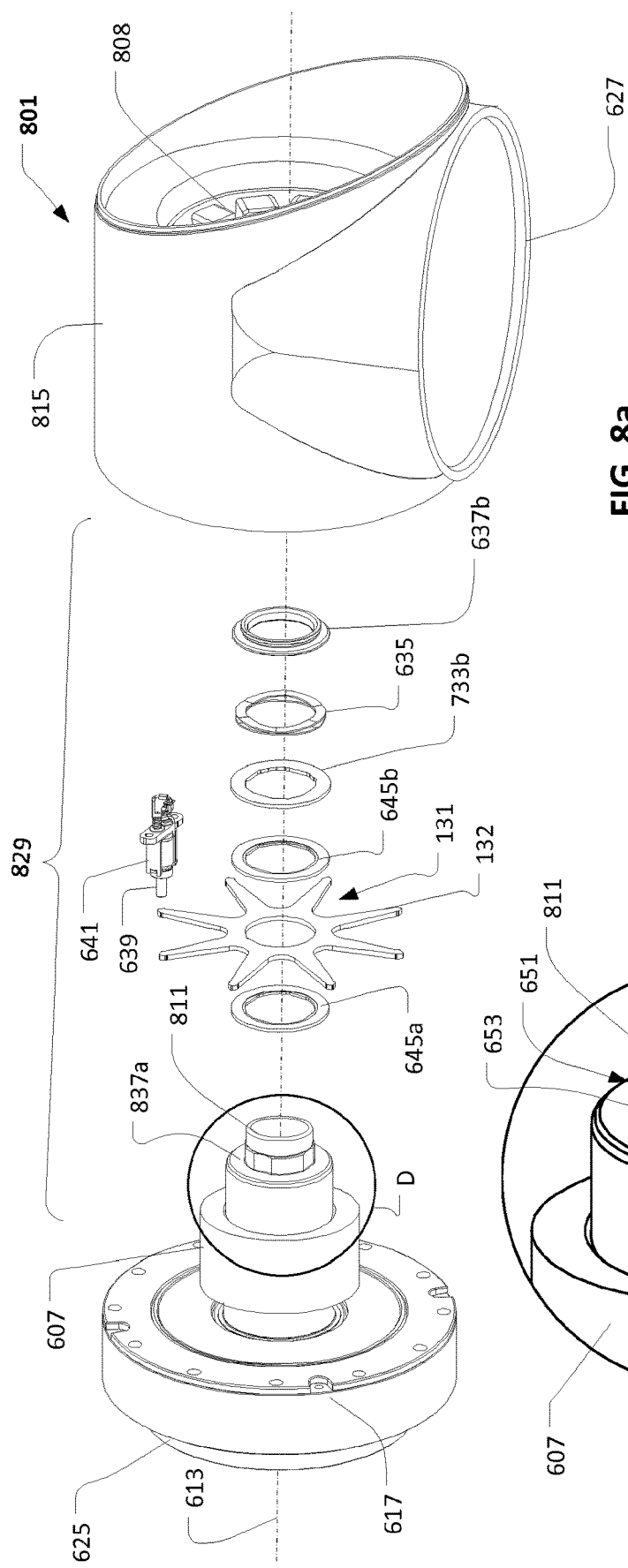
FIGS. 8a and 8b illustrate a robot joint comprising a brake assembly according to the present invention.

FIGS. 8a-8b illustrate a robot joint 801 of a robot arm with a brake assembly according to the present invention; where FIG. 8a illustrates an exploded perspective view of the robot joint and FIG. 8b illustrates an enlarge view of the part encircled by circle D in FIG. 7b. The robot joint 801 is similar to the robot joints 601 and 701 described in connection with FIGS. 6a, 6b, 7a and 7b and similar elements have been given the same reference numbers as in FIGS. 6a, 6b, 7a and 7b and will not be described in further detail. In this illustration the motor stator 807 is visible inside the robot housing 815.

In this embodiment the first locking member 837a of the brake assembly 829 is provided as an annular protrusion of the motor axle 811 and annular friction member 645a rests at the annular protrusion of the motor axle. The annular protrusion extends to the end of the motor axle 811 and into the strain wave gear. The motor stator 607 is thus attached to the annular protrusion. In this embodiment the cross-section area of the annular protrusion is at least as large as the cross section area of the annular friction member and a good contact surface between the first annular friction member and the annular protrusion is thus large and the force there between in thus distributed across the large contact surface.

Further the annular brake member 131 is provide as the annular brake member known from the prior art and illustrated in FIG. 1a.

FIGS. 9a and 9b illustrate a method of braking a robot joint of a robot arm according to the present invention and serve to illustrate the principles of the method, where FIG. 9a illustrates a flow diagram of the method and FIG. 9b illustrates a structural diagram of the robot joint during the method. The method is illustrated in view of a robot joint like the robot joint illustrated in FIG. 3 and similar element have been given the same reference numbers as in FIG. 3 and will not be described further.

Step 961 is a step of providing a robot joint housing 215 and step 962 is a step of arranging a joint motor 205 having a motor axle 511 rotatable around a motor axis at least partially inside the joint housing. In the illustrated embodiment the joint motor and motor axle is arranged inside the joint housing as one of the first steps, however it is noted that the brake assembly can be provided to the motor axle by carrying out at least some of the other steps prior to arranging the joint motor and motor axle inside the joint housing.

Step 963 is a step of providing a first locking member at the motor axle. In the illustrated embodiment this is performed by arranging a first locking member 236a onto the motor axle as indicated by 973 and then fixing the locking member to the motor axle. Alternatively, the first locking member can be provided as an annular protrusion of the motor axle for instance as annular protrusions 437a, 737a, 837a respectively illustrated in FIG. 4, FIG. 7 and FIG. 8.

Step 964a is a step of arranging an annular friction member 345a onto the motor axle as indicated by arrow 774a, at a position next to the first locking member. It is noted that the step 964a is an optional step and can be omitted.

Step 965 is a step of arranging an annular brake member 231 onto the motor axle, as illustrated by arrow 975, such that the annular brake member is rotatable in relation to the motor axle. In the illustrated embodiment the annular brake member is arranged next to the annular friction member, but the annular brake member can in embodiments where step 964a has been omitted be arranged next to the first locking member.

Step 964b is a step of arranging an annular friction member onto the motor axle as indicated by arrow 774b, at a position next to the annular brake member. It is noted that step 964b is an optional step and can be omitted.

Step 966 is a step of arranging a resilient member 235 onto the motor axle, as illustrated by arrow 976. In the illustrated embodiment the resilient member is arranged at a position next to the annular friction member. In embodiments where step 964b has been omitted the annular brake member will be arranged next to the first annular brake member.

Step 967 is a step of arranging a positionable locking member 236b onto the motor axle, such that the annular brake member and the at least one resilient member are arranged between the locking member 236a and the positionable locking member 263b and such that the at least one resilient member is in a tense setting. This is achieved by moving the positionable locking member along the motor axle as illustrated by arrow 977 and ensuring that the positionable locking member is fixed to the motor axle at the desired position. Step 967 can thus comprise a step of fixing the positionable locking member at a position along said motor axle. In the illustrated embodiment the step of arranging the positionable locking member onto the motor axle comprises a step of forcing a press fit ring onto the motor axle, which can be achieved by pressing the press fit ring until it is arranged at the desired position. In another embodiment the step of arranging the positionable locking member onto the motor axle can comprise a step of clamping a clamping ring onto said motor axle. In another embodiment the step of arranging the locking member onto the motor axle comprises a step of screwing a cross bolt locking ring screwed onto a thread provided at the motor axle.

Step 968 is a step of providing an output flange which is connected to and rotatable by the motor axle, as indicated by arrow 978. The output flange is connectable to at least another robot joint. In the illustrated embodiment the output flange is connected directly to the motor axle, however it is also possible to connect the output flange to the motor axle via a gearing system. Thus the step of providing the output flange can comprise a step of providing a gearing between the motor axle and the output flange.

Step 969 is a step of providing an engagement member 239. The engagement member 239 is movable (illustrated by arrow 243) between an engaging position (in solid lines) and a non-engaging position (in dotted lines), where in the engaging position the engagement member engages with the annular brake member and prevents rotation of the annular brake member around the motor axis, and where in the non-engaging position the engagement member allows the annular brake member to rotate around said motor.

Step 970 is a step of moving the engagement member into the engaging position. Consequently, the annular brake member stops rotating around the motor axis when the engagement member moves into the engaging position, and the motor axle is brought to stop due to friction between the annular brake member, the resilient member and the locking members. The resilient member is provided in a tense setting between the locking members and provides a pressing force to the annular brake member, as a consequence the friction between the annular brake member, the resilient member and the locking members are increased compared to a situation where the resilient member is arranged in a non-tense setting.

Steps 961 to 969 can for instance be carried out during manufacturing of the robot joint and robot arm and step 970 can be carried out during use of the robot arm. Also, it is to be understood that the order of the steps may be changed.

The method illustrated in FIGS. 9a and 9b serve to illustrate the principles of the method according to the present invention and is illustrated in view of the robot joint shown in FIG. 3, however it is noticed that the method also can be performed in connection with other kind of robot joints for instance the robot joints illustrated in FIG. 4-8.

Figure 10A:
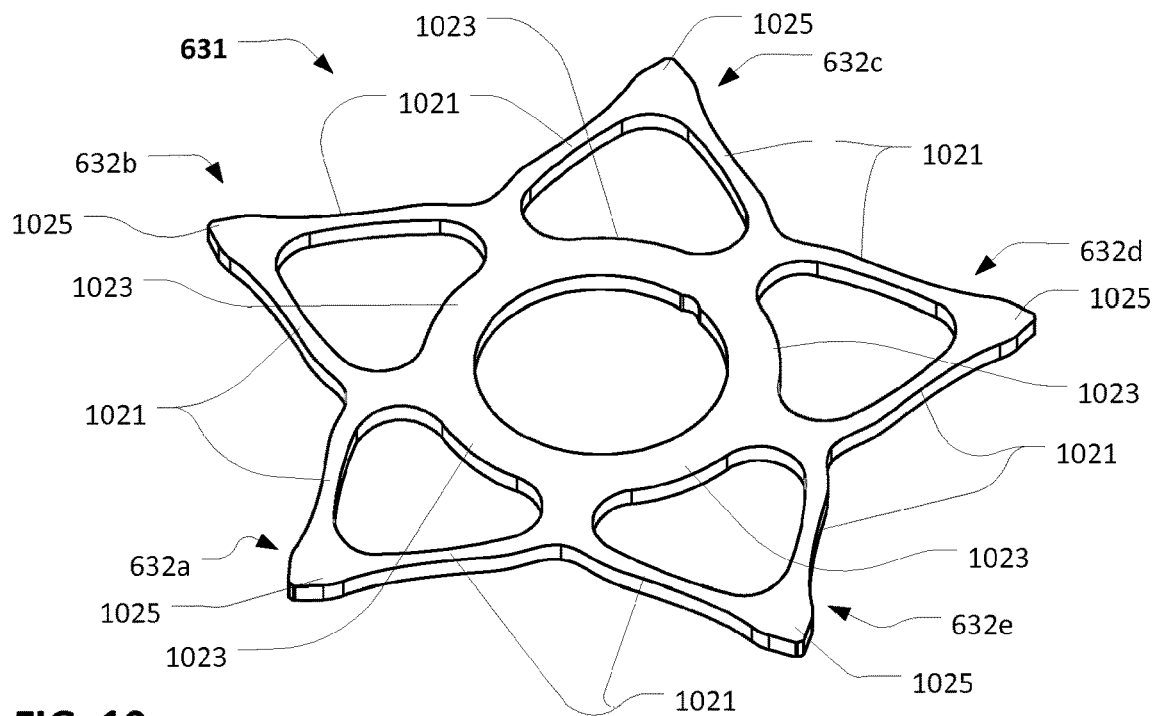
FIGS. 10a and 10b illustrate an annular brake member according to an aspect of the present invention.
Figure 10B:
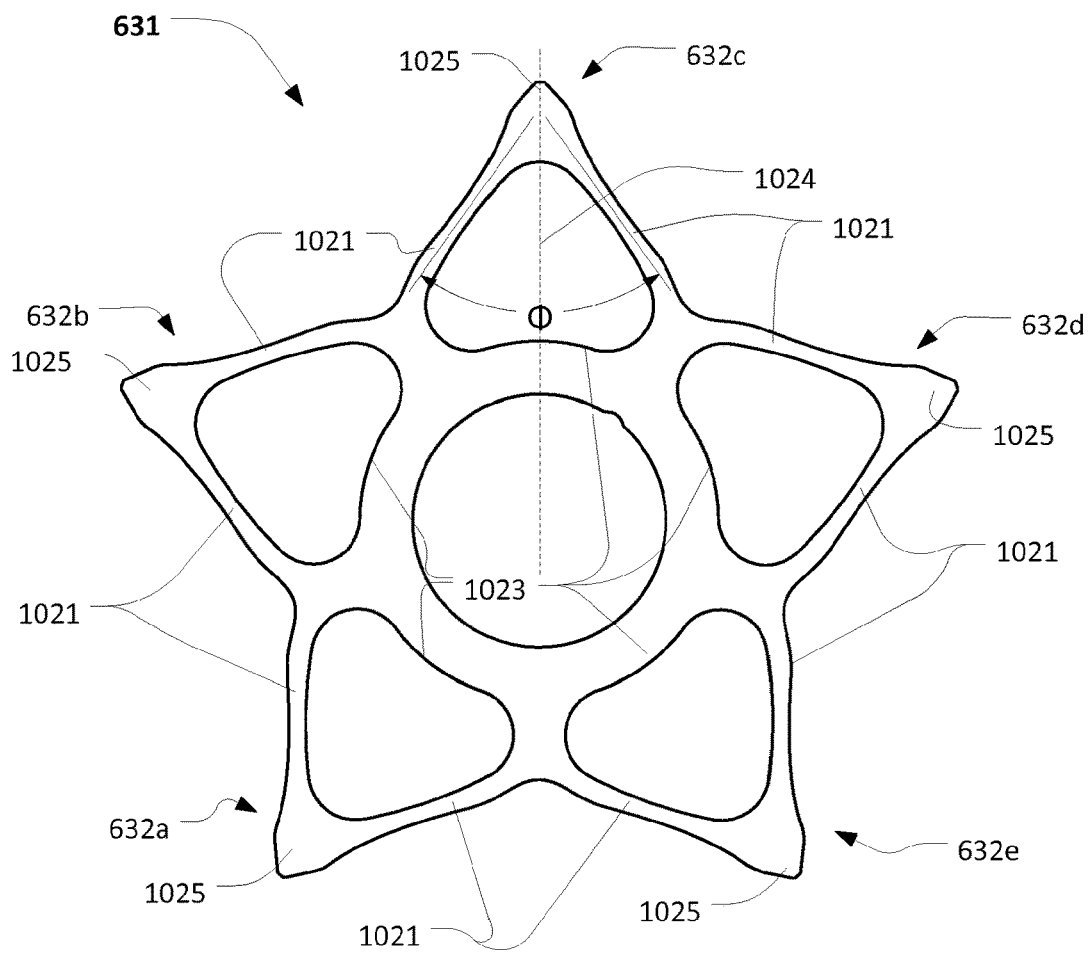

FIGS. 10a-10b illustrate an annular brake member 631 for a brake assembly of a robot joint; where FIG. 10a illustrates a perspective view and FIG. 10b illustrates a top view. The annular brake member is configured to be rotatable arranged on a motor axle of a joint motor of a robot joint. The annular brake member 631 is like the annular brake member 631 of the brake assembly illustrated in FIGS. 6a-6b and 7a-7b.

The annular brake member 631 is provided as an annular ring comprising six brake protrusions 632a-f extending outward in relation to the annular ring. The engaging member (e.g. in form of a brake pin) is in the engaging position moved into a position between two neighboring brake protrusions of the annular brake member, and the annular brake member will rotate until one of the brake protrusions bumps into the engaging member. In this embodiment, the six brake protrusions are embodied as a frame work of interconnected slats 1021. Each brake protrusion comprises two slats forming a triangular like shape, where the two slats form the sides of the triangular like shape and where a central part 1023 of the annular brake member forms the bottom side of the triangular like shape. Providing the brake members as two slats forming a triangular like shape makes it possible to provide a light and robust annular brake member with a low inertia, as the triangular like shape formed by the two slants supports reduces deformation of the brake members. The slant that bumps into the engaging member will bend in a direction opposite the direction of rotation of the annular brake member, however in this embodiment the other slant reduces/prevents such deformation as it takes up some of the forces applied to the brake member during the bump. Providing the brake members as a framework of slants makes it possible to reduce the mass of the annular brake member and as a consequence the rotational inertia of the annular brake member is reduced resulting in easier stoppage of the annular brake member.

In the illustrated embodiment the two slats forming the sides of the triangular like shape are symmetric around a radial line 1024 (only illustrated for brake protrusion 632c) going through the center of the annular member and the tip of triangular shape 1025. Providing the two slats forming the sides of the triangular like shape symmetrical around a radial line makes it possible to provide a robust brake protrusion which is independent of the direction of rotation of the annular brake member as such brake protrusion can withstand the similar brake force independent of the direction of rotation of the annular brake member. This is useful in connection with brake assemblies of robot joints where joint motor can in both directions.

In the illustrated embodiment the angle between the two slats forming the sides of the triangular like shape is approximately degrees 70 degrees providing a robust brake protrusion as at an angle of approximately 70 degrees between the two slats makes it possible for the two slats to take up forces from each other upon engagement with the engagement member. At the same time the angle of approximately 70 degrees makes it possible to provide a brake protrusion which extends significantly outwards in relation to the central part of the annular brake member, where a larger brake torque is generated upon braking of the robot arm. The angle between the two slats forming the sides of the triangular like shape can thus be smaller than 120 degrees, for instance between 50-90 degrees.

Further the tip of the triangular like shape forms an engaging portion of the brake protrusion and the engaging portions is configured to engage the engagement.

Figure 11A:
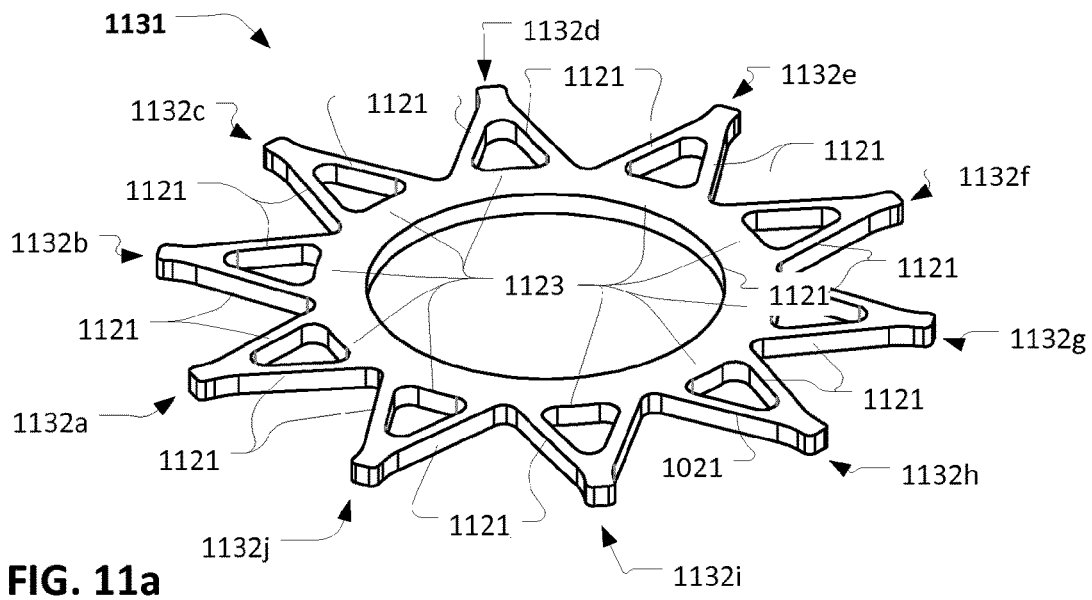
FIGS. 11a and 11b illustrate another annular brake member according to an aspect of the present invention.
Figure 11B:
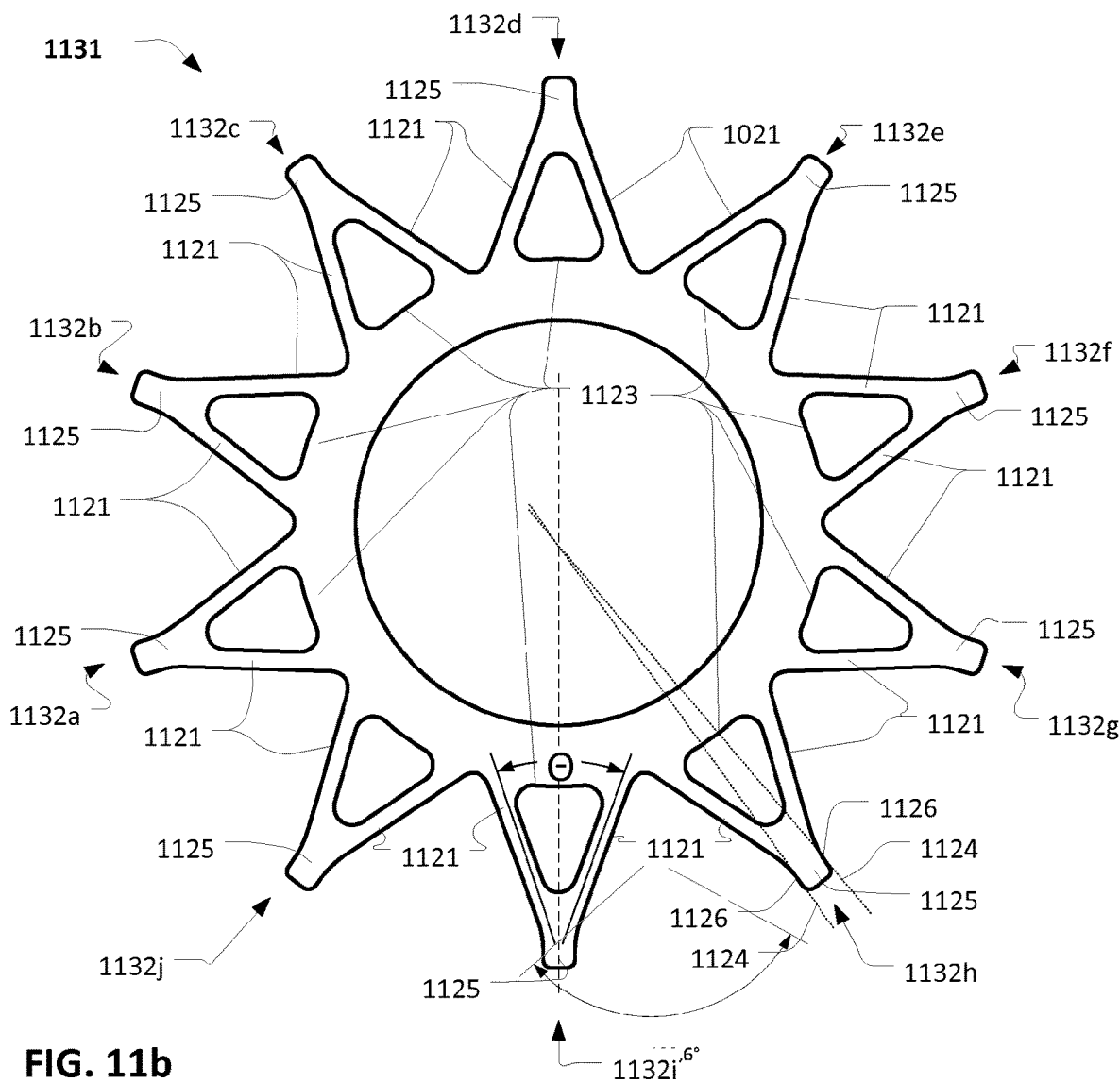

FIGS. 11a-11b illustrate an annular brake member 1131 for a brake assembly of a robot joint; where FIG. 11a illustrates a perspective view and FIG. 11b illustrates a top view. The annular brake member is configured to be rotatable arranged on a motor axle of a joint motor of a robot joint, where the motor axle is rotatable around a motor axle. The annular brake member comprises a plurality of brake protrusions 1132a-j configured to engage with an engagement member whereby engagement between at least one of the brake protrusions and the engagement member prevents rotation of the annular brake member around the motor axis. The plurality of brake protrusions 1132a-j are formed by a frame work of interconnected slats 1121 and at least one of the brake protrusion comprises two slats forming a triangular like shape, where the two slats form the sides of the triangular like shape and where a central part of the annular brake member forms the bottom side 1123 of the triangular like shape. As described in connection with FIG. 10. this makes it possible to reduce the mass of the annular brake member and as a consequence the rotational inertia of the annular brake member is reduced resulting in easier stoppage of the annular brake member.

In this embodiment the two slats forming the sides of triangular like shape are symmetric around a radial line 1124 (only illustrated for brake protrusion 1132i) going through the center of the annular member and the tip of triangular shape 1125. As described in connection with FIG. 10 this makes it possible to provide a robust brake protrusion which is independent of the direction of rotation of the annular brake member as such brake protrusion can withstand the similar brake force independent of the direction of rotation of the annular brake member. This is useful in connection with brake assemblies of robot joints where joint motor can rotate in both directions.

In the illustrated embodiment the angle θ between the two slats forming the sides of the triangular like shape is approximately 40 degrees. This makes it possible to increase the number of brake protrusions around the center of the annular brake member and at the same time maintain the advantages of the two interconnected stats taking up forces from each other. In a brake assembly the increased number of brake protrusions reduces the maximum angular distance that the annular brake member needs to rotate before engaging the engagement. The angle (0, 0) between the two slats forming the sides of the triangular like shape can thus be at least 30 degrees, for instance between 35-degrees.

Further the tip of the triangular like shape forms an engaging portion of the brake protrusion and the engaging portions if configured to engage the engagement. The tip 1125 of the brake protrusions is thus configured to engage with the engaging member and the tip comprises a radial engaging side (1126) configured to engage the engaging member. The radial engaging side is formed as a radial line section forming part of a radial line (1122) through the center of the annular brake member. Forming the engaging part of the annular brake protrusions as a radial line section forming part of a radial line (1122) through the center of the annular brake member result in the fact that the brake force between the engagement member and brake protrusion upon engagement is substantially tangential to the to the direction of rotation. Consequently, most of the brake force is used to stop the rotation of the annular brake member. Additionally, eventual brake forces which eventually are directed away or towards the motor axis are reduced which reduces wear between the motor axle and the annular brake member and the risk that the brake force may cause dis-alignment of the motor axle. In the illustrated embodiment the tip of the annular brake comprise two radial engaging sides arranged at opposite sides of the annular brake protrusion. This ensures optimal breaking in both directions of rotation.

The invention claimed is:

1. A robot joint for a robot arm, the robot joint being connectable to at least another robot joint via an output flange, the robot joint comprising:
   a joint housing;
   a joint motor in the joint housing, the joint motor comprising a motor axle that is rotatable around a motor axis, the motor axle being configured to rotate the output flange relative to the joint housing; and
   a brake assembly comprising:
      an annular brake member on the motor axle, where the annular brake member is configured to rotate on the motor axle around the motor axis, and where the annular brake member comprises:
         brake protrusions configured to engage an engagement member such that engagement between at least one of the brake protrusions and the engagement member prevents rotation of the annular brake member around the motor axis;
      wherein the brake protrusions comprise a framework of interconnected slats, where at least one of the brake protrusions comprises two slats forming a triangular-like shape, where the two slats form sides of the triangular-like shape, and where a central part of the annular brake member forms a bottom side of the triangular-like shape.

2. The robot joint of claim 1, wherein the two slats are symmetric around a radial line through a center of the annular brake member and a tip of the triangular-like shape.

3. The robot joint of claim 1, wherein an angle between the two slats is at least 30 degrees.

4. The robot joint of claim 1, wherein an angle between the two slats is smaller than 120 degrees.

5. The robot joint of claim 1, wherein a tip of at least one of the brake protrusions is configured to engage with the engagement member; and
   wherein the tip comprises a radial engaging side, the radial engaging side comprising a radial line section forming part of a radial line through a center of the annular brake member.

6. The robot joint of claim 1, wherein the annular brake member is configured to rotate on the motor axle of the joint motor to rotate the output flange relative to the joint housing, the output flange for connecting to another robot joint; and
   wherein the brake assembly further comprises:
      at least one resilient member configured to apply a pressing force to the annular brake member;
      a first locking member and a second locking member on the motor axle on opposite sides of the annular brake member and the at least one resilient member such that the annular brake member and the at least one resilient member are between the first locking member and the second locking member and are under tension;
      the engagement member that is movable between an engaging position and a non-engaging position, where in the engaging position the engagement member engages with the annular brake member and prevents rotation of the annular brake member, and where in the non-engaging position the engagement member allows the annular brake member to rotate;
      wherein at least one of the first locking member or the second locking member comprises a positionable locking member that can be fixed at different positions along the motor axle; and
      wherein a distance between the first locking member and the second locking member is adjustable in order to adjust the tension between the annular brake member and the at least one resilient member.

7. The robot joint of claim 6, wherein the brake assembly comprises at least one annular friction member on the motor axle next to the annular brake member;
   where the annular brake member and the at least one annular friction member are in physical contact on the motor axle; and
   wherein the at least one annular friction member is configured to produce friction between the annular brake member and the motor axle.

8. The robot joint of claim 6, wherein the annular brake member is between a first annular friction member and a second annular friction member on the motor axle; and
   wherein the annular brake member has a first side in physical contact with the first annular friction member and has a second side in physical contact with the second annular friction member.

9. The robot joint of claim 7, wherein the at least one annular friction member is configured not to rotate on the motor axle.

10. The robot joint of claim 6, wherein each of the brake protrusions comprises two slats forming a triangular-like shape, where the two slats form sides of the triangular-like shape, and where a central part of the annular brake member forms a bottom side of the triangular-like shape.

11. The robot joint of claim 6, wherein the positionable locking member comprises a press-fit ring having a smaller diameter than the motor axle; and
   wherein the press-fit ring is secured on the motor axle through force.

12. The robot joint of claim 6, wherein the positionable locking member comprises a clamp ring, the clamp ring comprising clamping means configured to clamp the clamp ring at a position along the motor axle by force such that the clamp ring is kept at the position when the at least one resilient member is under tension.

13. The robot joint of claim 6, wherein the positionable locking member comprises a cross bolt locking ring screwed onto a thread at the motor axle.

14. A method of braking the robot joint of claim 1, the method comprising:
   operating the joint motor to rotate the motor axle and thereby rotate the annular brake member and also rotate the output flange relative to the joint housing;
   moving the engagement member to an engaging position from a non-engaging position to cause the robot joint to brake, where in the engaging position the engagement member engages with the annular brake member to stop rotation of the annular brake member around the motor axis, and where in the non-engaging position the engagement member allows the annular brake member to rotate around the motor axis;

wherein there is a first locking member on the motor axle; and wherein there is a positionable locking member on the motor axle, the annular brake member and at least one resilient member being between the first locking member and the positionable locking member on the motor axle such that the at least one resilient member is under tension.

15. The method of claim 14, further comprising fixing the positionable locking member at position along the motor axle.

16. The method of claim 14, wherein there is at least one annular friction member on the motor axle next to, and in physical contact with, the annular brake member.

17. The method of claim 14, further comprising forcing a press-fit ring onto the motor axle.

18. The method of claim 14 further comprising clamping a clamping ring onto the motor axle to arrange the positionable locking member on the motor axle.

19. The method of claim 14 further comprising screwing a cross bolt locking ring onto a thread on the motor axle to arrange the positionable locking member on the motor axle.

20. A robot joint for a robot arm, the robot joint being connectable to at least another robot joint via an output flange, the robot joint comprising:
 a joint housing;
 a joint motor in the joint housing, the joint motor comprising a motor axle that is rotatable around a motor axis, the motor axle is being configured to rotate the output flange relative to the joint housing; and
 a brake assembly comprising:
  an annular brake member on the motor axle;
  at least one resilient member configured to apply a pressing force to the annular brake member;
  a first locking member and a second locking member on opposite sides of the annular brake member and the at least one resilient member such that the annular brake member and the at least one resilient member are under tension between the first locking member and the second locking member; and
  an engagement member that is movable between an engaging position and a non-engaging position, where in the engaging position the engagement member engages with the annular brake member and prevents rotation of the annular brake member, and where in the non-engaging position the engagement member allows the annular brake member to rotate;
 wherein the annular brake member comprises:
  brake protrusions configured to engage the engagement member such that engagement between at least one of the brake protrusions and the engagement member prevents rotation of the annular brake member around the motor axis;
  wherein the brake protrusions comprise a framework of interconnected slats, where at least one of the brake protrusions comprises two slats forming a triangular-like shape, where the two slats form sides of the triangular-like shape, and where a central part of the annular brake member forms a bottom side of the triangular-like shape.

21. The robot joint of claim 20, wherein a tip of at least one of the brake protrusions is configured to engage with the engagement member;
 wherein the tip comprises a radial engaging side, the radial engaging side comprising a radial line section forming part of a radial line through a center of the annular brake member; and
 wherein the engagement member in the engaging position is configured to engage the radial engaging side of at least one of the brake protrusions.

22. The robot joint of claim 1, wherein each of the brake protrusion comprises two slats forming a triangular-like shape, where the two slats form sides of the triangular-like shape, and where a central part of the annular brake member forms a bottom side of the triangular-like shape.

* * * * *